United States Patent [19]
Taguchi

[11] Patent Number: 5,339,054
[45] Date of Patent: Aug. 16, 1994

[54] MODULATED SIGNAL TRANSMISSION SYSTEM COMPENSATED FOR NONLINEAR AND LINEAR DISTORTION

[75] Inventor: Tetsu Taguchi, Tokyo, Japan

[73] Assignee: NEC Corporation, Tokyo, Japan

[21] Appl. No.: 84,609

[22] Filed: Jul. 1, 1993

[30] Foreign Application Priority Data

Jul. 1, 1992 [JP] Japan .................. 4-173930

[51] Int. Cl.⁵ ............................. H04L 25/49
[52] U.S. Cl. ....................... 332/100; 332/103;
332/107; 332/124; 332/144; 332/160; 375/51;
375/57; 375/58; 375/60; 455/63
[58] Field of Search ............... 332/100, 103, 107, 124,
332/144, 160; 375/51, 57, 58, 60; 455/63

[56] References Cited

U.S. PATENT DOCUMENTS 5,105,445 4/1992 Karam et al. .................. 332/107 X

*Primary Examiner*—Siegfried H. Grimm
*Attorney, Agent, or Firm*—Sughrue, Mion, Zinn, Macpeak & Seas

[57] ABSTRACT

In a modulated signal transmission system operable in response to an input digital signal of a baseband to produce a modulated signal through a nonlinear amplifier, a nonlinear converter is controlled by a control signal generator to compensate for not only a nonlinear distortion but also a linear distortion. The control signal generator is given a difference signal between a linearly detected signal and the input digital signal to which an estimated linear distortion is added by a linear filter having filter coefficients controlled by a filter coefficient estimator. An additional nonlinear converter is located prior to the linear filter. Alternatively, the linear filter may be located after the nonlinear converter.

7 Claims, 7 Drawing Sheets

MODULATED SIGNAL TRANSMISSION SYSTEM COMPENSATED FOR NONLINEAR AND LINEAR DISTORTION

BACKGROUND OF THE INVENTION

This invention relates to a modulated signal transmission system which is capable of adaptively compensating for nonlinearity of a power amplifier in a baseband.

With a development of high efficiency digital transmission, a high precision and a multi-level have been required in connection with modulation and demodulation. For example, on multilevel quadrature amplitude modulation in radio communication, it is very important in a transmission system to prevent an increase of a nonlinear distortion which might occur in a power amplifier. In other words, the power amplifier should have a linear amplification characteristic.

To this end, it is usual that the power amplifier is formed by a class A amplifier which has excellent linearity. However, use of such a class A amplifier results in a reduction of power efficiency.

On the other hand, a class B amplifier is often used as the power amplifier in the transmission system. As well known in the art, the class B amplifier is good in power efficiency but is inferior in linearity to the class A amplifier. Taking this into consideration, a linearizer which wall be often called a nonlinear compensator or a nonlinear converter is combined with the class B amplifier so as to compensate for nonlinearity of the class B amplifier. The combination of the class B amplifier and the linearizer enables improvement of not only the power efficiency but also the nonlinearity of the class B amplifier.

More specifically, the linearizer has a nonlinear conversion characteristic adaptively controlled and is operable in response to both an input signal of a baseband and a linearly detected signal which is obtained by linearly detecting a modulated signal sent from the power amplifier. The linearizer compares the input signal with the linearly detected signal to adaptively control the nonlinear conversion characteristic.

With this structure, it is possible to favorably compensate for a nonlinear distortion included in the modulated signal sent from the power amplifier. However, it has been found out that the linearizer can not completely compensate for a linear distortion. This is because no distinction between the nonlinear and the linear distortions is made in the linearizer and the nonlinear distortion alone is compensated by the linearizer.

SUMMARY OF THE INVENTION

It is an object of this invention to provide a modulated signal transmission system which is capable of preferably compensating not only for a nonlinear distortion but also for a linear distortion.

It is another object of this invention to provide a modulated signal transmission system of the type described, which is capable of simply compensating for the linear distortion.

A modulated signal transmission system to which this invention is applicable is for use in modulating an input signal of a baseband to produce, through a nonlinear amplifier, a modulated signal which is substantially free from both a nonlinear distortion and a linear distortion. The nonlinear amplifier has a nonlinear amplification characteristic. According to an aspect of this invention, the modulated signal transmission system comprises linear detection means partially supplied with the modulated signal for linearly detecting the modulated signal to produce a linearly detected signal, estimating means supplied with the input signal and the linearly detected signal for estimating the linear distortion to produce an estimated signal including the estimated linear distortion, difference calculation means supplied with the estimated signal and the linearly detected signal for calculating a difference of electric power between the estimated signal and the linearly detected signal to produce a control signal representative of the difference, and nonlinear converting means, which has a controllable nonlinear conversion characteristic for compensation of the nonlinear amplification characteristic of the nonlinear amplifier and which is supplied with the input signal and the control signal, for carrying out nonlinear conversion of the input signal in response to the control signal so as to reduce the difference and to thereby remove both the nonlinear and the linear distortions.

According to another aspect of this invention, the modulated signal transmission system comprises linear detection means partially supplied with the modulated signal for linearly detecting the modulated signal to produce a linearly detected signal, nonlinear converting means, which has a controllable nonlinear conversion characteristic for compensation of the nonlinear amplification characteristic of the nonlinear amplifier and which is supplied with the input signal and a control signal, for carrying out nonlinear conversion of the input signal in response to the control signal so as to remove the nonlinear distortion and to produce a converted signal, preliminary processing means for preliminarily processing the input signal into a processed signal, difference calculation means supplied with the processed signal and the linearly detected signal for calculating a difference of electric power between the processed signal and the linearly detected signal to produce a control signal representative of the difference, supply means for supplying the control signal to the nonlinear converting means to control the controllable nonlinear conversion characteristic of the nonlinear converting means, linear filtering means, which is coupled to the nonlinear converting means and which has a plurality of controllable filter coefficients to define a filter characteristic determined by the controllable filter coefficients, for filtering the converted signal into a filtered signal, coefficient determining means supplied with the input signal and the linearly detected signal and connected to the linear filtering means for estimating the linear distortion to calculate the filter coefficients concerned with the linear distortion to supply the filter coefficients to the linear filter means, and means connected to the linear filtering means for supplying the filtered signal to the nonlinear amplifier. The preliminary processing means may produce the input signal as the processed signal with the input signal kept unchanged or may produce a nonlinearly converted signal as the processed signal.

DESCRIPTION OF THE PREFERRED EMBODIMENTS

Figure 1:
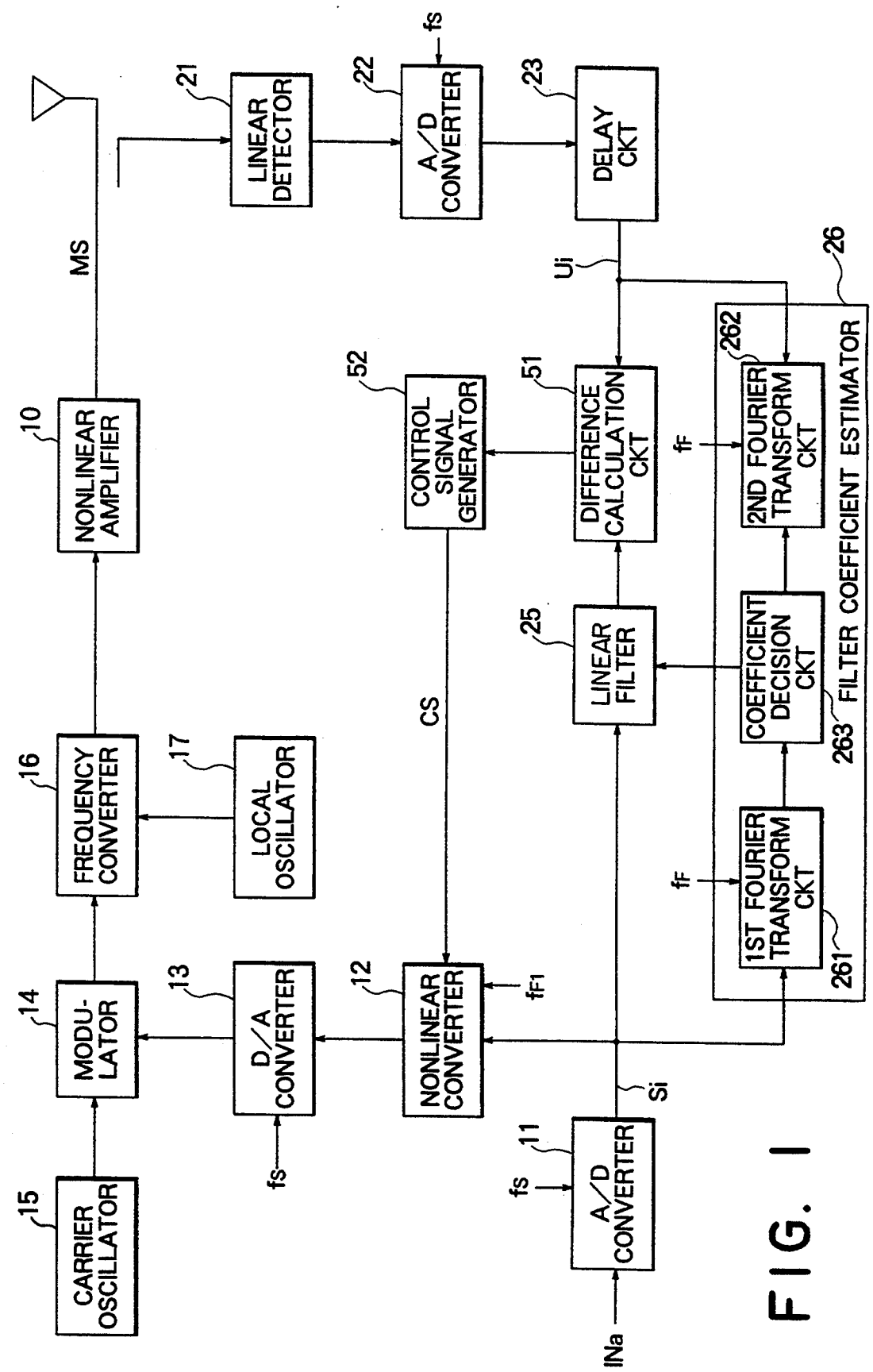
FIG. 1 is a block diagram of a modulated signal transmission system according to a first embodiment of this invention.

Referring to FIG. 1, a modulated signal transmission system according to a first embodiment of this invention is supplied with a system input signal INa of a baseband which is given in the form of an analog signal and which may be, for example, a speech signal. In addition, the illustrated transmission system generates a modulated signal MS as a radio signal through a nonlinear amplifier 10 and an antenna (unnumbered). The nonlinear amplifier 10 may be a class B amplifier which has a nonlinear amplification characteristic.

Specifically, the system input signal INa is sent to an analog-to-digital (A/D) converter 11 which is operable to sample the system input signal INa at a sampling frequency fs and to convert the system input signal INa into a sequence of digital baseband signal Si which may be simply referred to as an input signal.

In the example being illustrated, the input signal Si is delivered to a nonlinear converter 12 which may be called a linearizer and which acts to adaptively control or compensate for a nonlinear distortion included in the input signal Si in a manner to be described later in detail. In this event, the nonlinear converter 12 has a nonlinear conversion characteristic which can compensate for the nonlinear amplification characteristic of the nonlinear amplifier 10 and which is adaptively controllable in response to a control signal CS produced in a manner to be mentioned later. At any rate, the nonlinear converter 12 carries out nonlinear compensation of the input signal Si in response to the control signal CS to produce a distortion compensated signal such that the nonlinear amplification characteristic of the nonlinear amplifier can be compensated.

The distortion compensated signal is sent to a digital-to-analog (D/A) converter 13 which converts the distortion compensated signal into an analog converted signal in response to a timing signal which has the same frequency as the sampling frequency fs of the A/D converter 11. The analog converted signal is supplied to a modulator 14 which is given a carrier frequency of an intermediate frequency band from a carrier oscillator 15 and which amplitude modulates the analog converted signal into an intermediate frequency signal by the carrier frequency sent from the carrier oscillator 15. The intermediate frequency signal is supplied to a frequency converter 16 to be subjected to frequency conversion by the use of a local oscillator 17 and is frequency converted into a pre-amplification signal of a transmission frequency band. The pre-amplification signal is power amplified by the nonlinear amplifier 10 into the modulated signal MS which is transmitted as the radio signal through the antenna, as mentioned before.

On the other hand, the modulated signal MS is partially delivered to a linear detector 21 to be subjected to linear detection and is thereafter sent to an analog-to-digital (A/D) Converter 22 to be sampled at the sampling frequency fs and to be converted into a sequence of detected digital signals. The detected digital signal sequence is delayed by a delay circuit 23 and is produced as a linearly detected signal Ui. In this connection, a combination of the linear detector 21, the analog-to-digital (A/D) converter 22, and the delay circuit 23 may be referred to as a linear detection circuit.

In the meanwhile, it has been found out that a linear distortion undesirably remains in the linearly detected signal Ui, even when the nonlinear distortion which might occur in the nonlinear amplifier 10 and the like is completely removed from the linearly detected signal Ui by an ideal operation of the nonlinear converter 12.

Taking the above into account, the linear distortion is also removed from the linearly detected signal Ui in the modulated signal transmission system illustrated in FIG. 1. To this end, the linear distortion in the linearly detected signal Ui is estimated as an estimated linear distortion in the illustrated example. Subsequently, the estimated linear distortion is added to the input signal Si to obtain a sum of the estimated linear distortion and the input signal Si and to form a sum signal representative of a result of the estimated linear distortion and the input signal Si. The sum signal is compared with the linearly detected signal Ui to detect a difference or an error between the sum signal and the linearly detected signal Ui. The nonlinear converter 12 is controlled in consideration of the difference between the sum signal and the linearly detected signal Ui in a manner to be described later.

More specifically, a linear filter 25 is included in the illustrated transmission system to add the estimated linear distortion to the input signal Si to produce the sum signal. The linear filter 25 may be implemented by a transversal filter of a p-th order which has a plurality of filter coefficients, p in number, adaptively controlled by a filter coefficient estimator 26. The filter coefficient estimator 26 is supplied with the input signal Si and the linearly detected signal Ui to determine each of the filter coefficients.

In the illustrated example, the filter coefficient estimator 26 comprises first and second Fourier transform circuits 261 and 262 supplied with the input signal Si and the linearly detected signal Ui to carry out Fourier transform of the input signal Si and the linearly detected signal Ui, respectively. Specifically, the first Fourier transform circuit 261 carries out Fourier transform of the input signal Si by the use of a frame frequency $f_F$ to obtain a plurality of first frequency samples, 512 in number, as a result of the Fourier transform. This shows that the frequency samples are calculated at every one of the sampled digital signals included in the input signal. Likewise, the second Fourier transform circuit 262 carries out Fourier transform of the linearly detected signal Ui by the use of the frame frequency $f_F$ to obtain a plurality of second frequency samples, 512 in number. Both the first and the second frequency samples are sent to the coefficient decision circuit 263 to calculate the filter coefficients.

Figure 2:
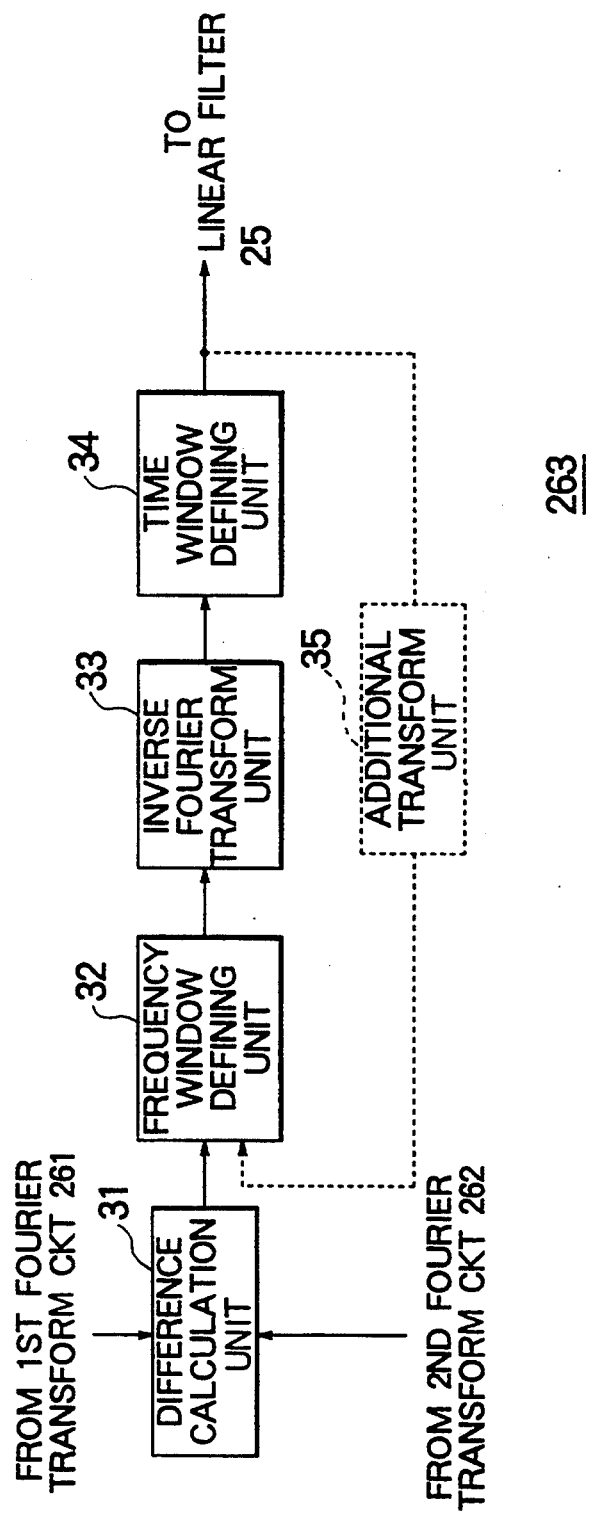
FIG. 2 is a block diagram of a filter coefficient estimator applicable to the modulated signal transmission system illustrated in FIG. 1.

Referring to FIG. 2 together with FIG. 1, the coefficient decision circuit 263 comprises a difference calculation unit 31 for calculating differences between each of the first frequency samples and the corresponding one of the second frequency samples to produce difference signals representative of the differences, a frequency window defining unit 32 for defining a frequency window to remove high frequency components and to restrict the difference signal within the frequency window, and an inverse Fourier transform unit 33 for carrying out inverse Fourier transform of the difference signals to produce a plurality of time examples, 512 in number. The time samples are restricted within a time window defined by a time window defining unit 34 and are delivered to the linear filter 25 (FIG. 1) as the filter coefficients.

In FIG. 2, the difference calculation unit 31, the frequency window defining unit 32, the inverse Fourier transform unit 33, and the time window defining unit 34 may be replaced by a software program executed in a central processing Unit and may therefore be considered as software.

It is to be noted that the input signal Si has a spectrum similar to that of the linearly detected signal Ui. Therefore, all of the filter coefficients of 512 are not practically essential in the linear filter 25 and may be reduced in number. This means that a small number of the filter coefficients may be used for the linear filter 25. In general, the number of the filter coefficients may be smaller than tap number of, for example, 256 determined for the Fourier transform and may be equal to or smaller than ten.

In FIG. 2, the frequency window may be variable in width. In this case, the time samples may be subjected to Fourier transform by an additional Fourier transform unit 35 to be sent as Fourier transformed samples to the frequency window defining unit 32, as suggested by a broken line in FIG. 2. The frequency window defining unit 32 controls the width of the frequency window so that differences become small between the difference signals and the Fourier transformed samples. By repeating such control operation several times, it is possible to decrease estimated errors of the filter coefficients.

Figure 3:
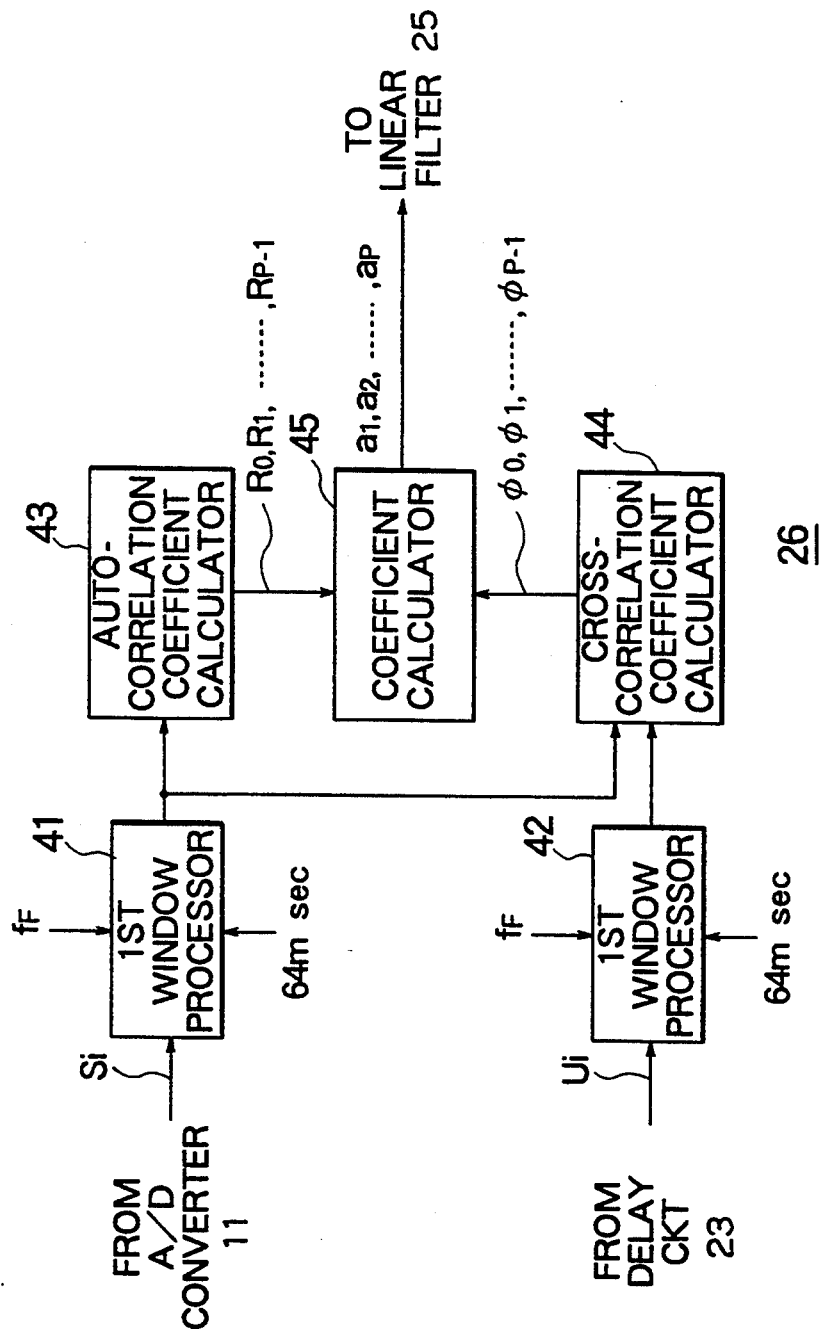
FIG. 3 is a block diagram of another filter coefficient estimator applicable to the modulated signal transmission system illustrated in FIG. 1.

Referring to FIG. 3 in addition to FIG. 1, illustration is made about another filter coefficient estimator 26 that is supplied with the input signal Si and the linearly detected signal Ui from the analog-to-digital (A/D) converter 11 and the delay circuit 23, respectively. The input signal Si and the linearly detected signal Ui are supplied to first and second window processors 41 and 42 both of which are operable in response to the frame frequency $f_F$ and which open a Hamming window of 64 milliseconds in synchronism with the frame frequency $f_F$ to obtain first and second isolated waveforms, respectively.

The first isolated waveform is delivered from the first window processor 41 to both an autocorrelation: coefficient calculator 43 and a cross-correlation coefficient calculator 44 while the second isolated waveform is sent from the second window processor 42 to the cross-correlation coefficient calculator 44.

The autocorrelation coefficient calculator 43 calculates, from the first isolated waveform, autocorrelation coefficients $R_0, R_1, \ldots, R_{p-1}$ of the input signal Si. On the other hand, the cross-correlation coefficient calculator 44 calculates, from the first and the second isolated waveforms, cross-correlation coefficients $\Phi_0, \Phi_1, \ldots, \Phi_{(p-1)}$ between the input signal Si and the linearly detected signal Ui. Both the autocorrelation coefficients $R_0, R_1, \ldots, R_{p-1}$ and the cross-correlation coefficients $\Phi_0, \Phi_1, \ldots, \Phi_{(p-1)}$ are supplied to a coefficient calculator 45.

The coefficient calculator 45 calculates filter coefficients $a_1, a_2, \ldots, a_p$ from the autocorrelation coefficients $R_0, R_1, \ldots, R_{p-1}$ and the cross-correlation coefficients $\Phi_0, \Phi_1, \ldots, \Phi_{(p-1)}$ in a manner to be described later in detail.

At first, it is assumed that the filter coefficients $a_1, a_2, \ldots, a_p$ are given from the filter coefficient estimator 26 to the linear filter 25 and that differences between an output signal of the linear filter 25 and the linearly detected signal Ui are represented by di. In this event, relationships between the input signals S (suffixes omitted) and the linearly detected signals U (suffixes omitted) are given by:

$$S_i a_1 + S_{i-1} a_2 + S_{i-2} a_3 + \ldots + S_{i-p+1} a_p + d_i = U_i \quad (1)$$
$$S_{i+1} a_1 + S_i a_2 + S_{i-1-1} a_3 + \ldots + S_{i-p+2} a_p + d_{i+1} = U_{i+1}$$
$$\vdots$$
$$S_{i+N} a_i + S_{i-1+N} a_2 + S_{i-2+N} a_3 + \ldots + S_{i-p+1+N} a_p + d_{i+N} = U_{i+N}$$

Equations (1) can be modified into:

$$S_i S_i a_i + S_i S_{i-1} a_2 + S_i S_{i-2} a_3 + \ldots + S_i S_{i-p+1} a_p + S_i d_i = S_i U_i \quad (2a)$$
$$S_{i+1} S_{i+1} a_i + S_{i+1} S_i a_2 + S_{i+1} S_{i-1} a_3 + \ldots + S_{i+1} S_{i-p+2} a_p + S_{i+1} d_{i+1} = S_{i+1} U_{i+1}$$
$$\vdots$$
$$S_{i+N} S_{i+N} a_1 + S_{i+N} S_{i-1+N} a_2 + S_{i+N} S_{i-2+N} a_3 + \ldots + S_{i+N} S_{i-p+1+N} a_p + S_{i+N} d_{i+N} = S_{i+N} U_{i+N}$$

Summation on both sides of Equations (2a) gives:

$$a_1 \sum_{j=0}^{N} S_{i+j} S_{i+j} + a_2 \sum_{j=0}^{N} S_{i+j} S_{i-1+j} + a_3 \sum_{j=0}^{N} S_{i+j} S_{i-2j} + \quad (3a)$$
$$\ldots + a_p \sum_{j=0}^{N} S_{i+j} S_{i-p+1+j} + \sum_{j=0}^{N} S_{i+j} d_{i+j} = \sum_{j=0}^{N} S_{i+j} U_{i+j}$$

Inasmuch as no correlation exists between the input signal Si and the difference di and the last term on the lefthand side of Equation (3a) is converged into zero, Equation (33a) can be rewritten, by neglecting the above-mentioned term and by the use of the auto-correlation coefficients and the cross-correlation coefficients, into:

$$a_1 R_0^{(i)} + a_2 R_{-1}^{(i)} + a_3 R_{-2}^{(i)} + \ldots + a_p R_{-p+1}^{(i)} = \Phi_0^{(i)} \quad , (4a)$$

where superscripts attached to the autocorrelation coefficients and the cross-correlation coefficients are representative of phases.

Likewise, Equations (2b) and (3b) can be obtained from Equations (1) and Equations (3b) can be rewritten into Equation (4b), as will be mentioned hereinunder.

$$S_{i-1}S_i a_i + S_{i-1}S_{i-1}a_2 + S_{i-1}S_{i-2}a_3 + \ldots + S_{i-1}S_{i-p+1}a_p + S_{i-1}d_i = S_{i-1}U_i \quad (2b)$$
$$S_i S_{i+1} a_i + S_i S_i a_2 + S_i S_{i-1} a_3 + \ldots + S_i S_{i-p+2} a_p + S_i d_{i+1} = S_i U_{i+1}$$
$$\vdots$$
$$S_{i-1+N}S_{i+N}a_1 + S_{i-1+N}S_{i-1+N}a_2 + S_{i-1+N}S_{i-2+N}a_3 + \ldots + S_{i-1+N}S_{i-p+1+N}a_p + S_{i-1+N}d_{i+N} = S_{i-1+N}U_{i+N}$$

$$a_1 \sum_{j=0}^{N} S_{i-1+j}S_{i+j} + a_2 \sum_{j=0}^{N} S_{i-1+j}S_{i-1+j} + a_3 \sum_{j=0}^{N} S_{i-1+j}S_{i-2+j} + \ldots + \quad (3b)$$
$$a_p \sum_{j=0}^{N} S_{i-1+j}S_{i-p+1+j} + \sum_{j=0}^{N} S_{i-1+j}d_{i+j} = \sum_{j=0}^{N} S_{i-1+j}U_{i+j}$$

$$a_1 R_1^{(i-1)} + a_2 R_0^{(i-1)} + a_3 R_{-1}^{(i-1)} + \ldots + a_p R_{-p+2}^{(i-1)} = \Phi_1^{(i-1)} \quad (4b)$$

In the like manner, Equations (4c) through (4x) are given by:

$$a_1 R_2^{(i-1)} + a_2 R_1^{(i-2)} + a_3 R_0^{(i-p)} + \ldots + a_p R_{-p+3}^{(i-2)} = \Phi_2^{(i-2)} \quad (4c)$$
$$\vdots$$
$$a_1 R_{p-1}^{(i-p+1)} + a_2 R_{p-2}^{(i-p+1)} + a_3 R_{p-3}^{(i-p+1)} + \ldots + a_p R_0^{(i-p+1)}$$

If the input signal Si and the linearly detected signal Ui is defined into an isolated waveform by a window which has an interval N equal to an infinite interval, a phase can be neglected and the autocorrelation coefficients become symmetrical with respect to zero, Equations (4a) to (4x) can be expressed by a matrix welch is given by:

$$\begin{bmatrix} R_0 & R_1 & R_2 & \ldots & R_p-1 \\ R_1 & R_0 & R_1 & \ldots & R_p-2 \\ R_2 & R_1 & R_0 & \ldots & R_p-3 \\ \vdots & \vdots & \vdots & & \vdots \\ R_p-1 & R_p-2 & R_p-3 & \ldots & R_0 \end{bmatrix} \begin{bmatrix} a_1 \\ a_2 \\ a_3 \\ \vdots \\ a_p \end{bmatrix} = \begin{bmatrix} \Phi_0 \\ \Phi_1 \\ \Phi_2 \\ \vdots \\ \Phi_{p-1} \end{bmatrix} \quad (5)$$

Equation (5) is rewritten into:

$$\begin{bmatrix} a_1 \\ a_2^{\phi(i-p-1)(4x)} \\ a_3 \\ \vdots \\ a_p \end{bmatrix} = \begin{bmatrix} R_0 & R_1 & R_2 & \ldots & R_p-1 \\ R_1 & R_0 & R_1 & \ldots & R_p-2 \\ R_2 & R_1 & R_0 & \ldots & R_p-3 \\ \vdots & \vdots & \vdots & & \vdots \\ R_p-1 & R_p-2 & R_p-3 & \ldots & R_0 \end{bmatrix}^{-1} \begin{bmatrix} \Phi_0 \\ \Phi_1 \\ \Phi_2 \\ \vdots \\ \Phi_{p-1} \end{bmatrix} \quad (6)$$

With reference to Equation (6), the coefficient calculator 45 calculates the filter coefficients $a_1, a_2, \ldots, a_p$ in a known manner.

Figure 4:
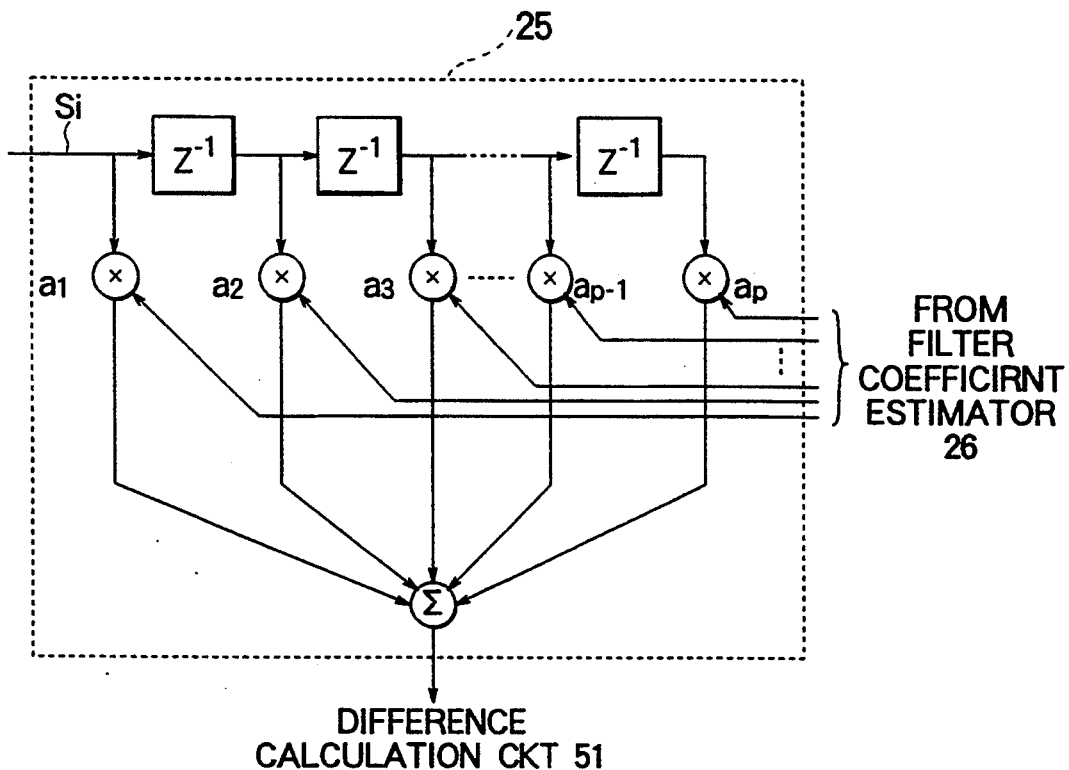
FIG. 4 is a block diagram of a linear filter usable in the transmission system illustrated in FIG. 1.

Referring to FIG. 4 together with FIG. 1, the filter coefficients $a_l$ to $a_p$ are delivered from the coefficient calculator 45 to the linear filter 25. The linear filter 25 may be used to add the linear distortion to the input signal Si.

In general, such addition of a linear distortion to an input signal Si may be accomplished by whitening or randomizing the input signal Si into a whitened or a randomized input signal and by impressing the whitened input signal into a filter which has a transfer function identical with a transfer function for the linearly detected signal Ui. More specifically, such operation can be carried out by whitening the input signal Si by the use of a whitening filter of a p-th order which has a plurality of taps, p in number, and by emphasizing a component corresponding to Ui by the use of an emphasizing filter of a p-th order which has a plurality of taps, p in number.

The taps, p in number, of the whitening filter are controlled by filter coefficients $b_1, b_2, \ldots, b_p$, while the taps, p in number, of the emphasizing filter are controlled by filter coefficients $c_1, c_2, \ldots, c_p$. At any rate, the filter coefficients $b_1$–$b_p$ can be obtained by opening a window for Fourier transformed input signals and by carrying out inverse Fourier transform for the Fourier transformed input signals. On the other hand, the filter coefficients $c_1$ to $c_p$ of the emphasizing filter are also obtained by opening a window for Fourier transformed linearly detected signals and by carrying out inverse Fourier transformed linearly detected signals. This means that a combination of the whitening and the emphasizing filters can be implemented by a transversal filter of a 2p-th order which will be called a high order transversal filter.

However, such a high order transversal filter is disadvantageous in that the filter coefficients are momentarily changed from one to another and that a delay time becomes large.

Taking this into consideration, the linear filter 25 illustrated in FIG. 1 is implemented by a transversal filter of a p-th order supplied with the input signal Si.

In FIG. 4, the linear filter 25 has a plurality of delay lines, p in number, depicted at $Z^{-1}$ and connected in series to one another, a plurality of taps, p in number, derived from each delay line, and a plurality of multipliers, p in number, connected to the taps and given the filter coefficients $a_1$ to $a_p$ from the filter coefficient estimator 26 illustrated in FIG. 1. The illustrated linear filter 25 produces a filtered output signal which includes an estimated linear distortion in addition to the input signal Si in a known manner and will not therefore be described in detail any longer.

Turning back to FIG. 1, a difference calculation circuit 51 is supplied with the filtered output signal and the linearly detected signal Ui to calculate a difference of electric power between the filtered output signal and the linearly detected signal Ui and to produce a difference signal representative of the difference of the electric power. The difference signal is sent to a control signal generator 52 to be delivered to the nonlinear converter 12 as the control signal CS. Thus, a combination of the difference calculation circuit 51 and the control signal generator 52 may be referred to as a difference calculator for calculating the difference to produce the control signal.

In FIG. 1, the control signal generator 52 supplies the nonlinear converter 12 with the control signal CS which includes an initial control signal and first, second, and third control signals representative of a first phase, a second phase, and a third phase, respectively. The nonlinear converter 12 is initialized in response to the initial control signal and is thereafter operable in the first through the third phases in response to the first through the third control signals, respectively.

Figure 5:
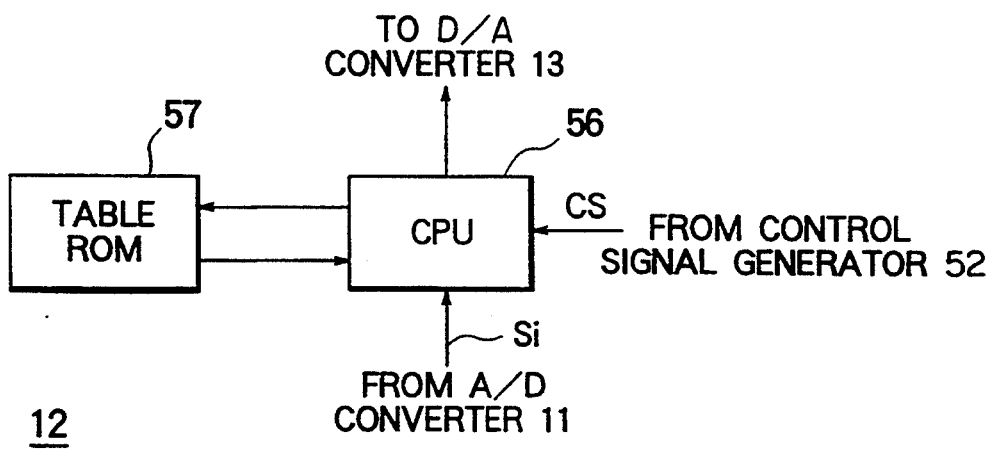
FIG. 5 is a block diagram of a nonlinear converter applicable to the transmission system illustrated in FIG. 1.

Referring to FIG. 5 together with FIG. 1, the nonlinear converter 12 comprises a central processing unit (CPU) 56 and a table ROM 57, as illustrated in FIG. 5. Briefly, the nonlinear converter 12 is controlled by the control signal CS so as to determine a nonlinear characteristic which takes into consideration the nonlinear amplification characteristic of the nonlinear amplifier 10 and the linear distortion specified by the difference signal sent from the difference calculation circuit 51 to the control signal generator 52.

Figure 6A:
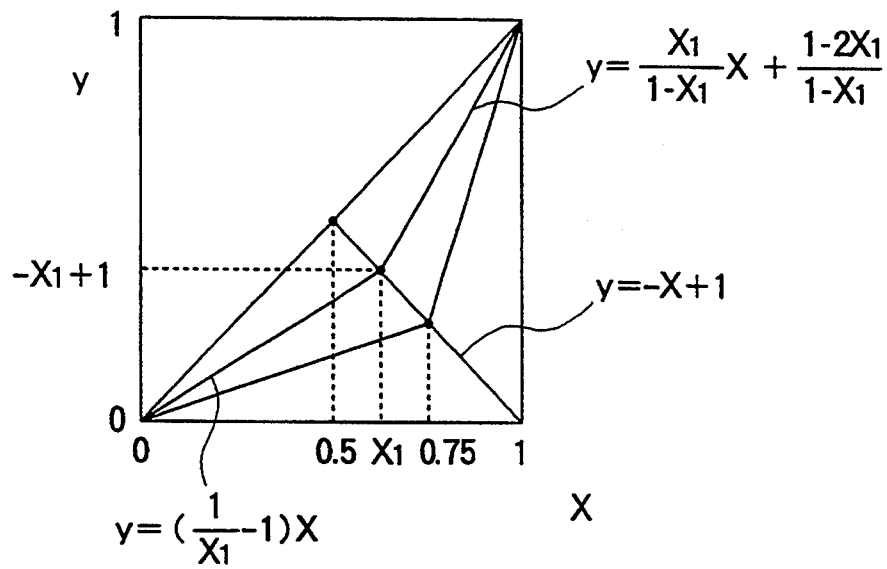
FIGS. 6(A) and (B) are graphical representations for use in describing operations of the nonlinear converter shown in FIG. 5.

Referring to FIGS. 6(A) and (B) together with FIG. 5, description will be made in connection with operation of the nonlinear converter 12. Responsive to the initial control signal CS given from the central signal generator 52, the nonlinear converter 12 is put into an initial state and is thereafter operable in the first through the third phases in response to the first through the third control signals from the control signal generator 52. At any rate, the nonlinear converter 12 carries out nonlinear conversion of the input signal Si in accordance with a nonlinear conversion characteristic approximated by a plurality of straight lines to produce the distortion compensated signal.

More specifically, the nonlinear converter 12 approximates the nonlinear conversion characteristic by the use of two straight lines in the first phase and by the use of four straight lines in the second and the third phases, as will be mentioned later.

It is to be noted in FIGS. 6(A) and (B) that the input signal Si and the distortion compensated signal are normalized and depicted at x and y, as taken along the abscissas and the ordinates of FIGS. 6(A) and (B), respectively.

In FIG. 6(A), the nonlinear conversion characteristic is assumed to be composed of the two straight lines which intersect each other at a cross point and that the cross point is located on an additional straight line represented by:

$$y = -x + 1.$$

Under the circumstances, candidate cross points are successively selected to determine a closest approximation cross point on the additional straight line and to estimate the closest approximation cross point as an optimum cross point. For example, let the optimum cross point be selected from candidate cross points, 256 in number, on the additional straight line of $y = -x + 1$. In this case, it is possible to determine the optimum cross point from the candidate cross points of 256 by repeating similar operations eight times.

Specifically, it is assumed that the optimum cross point is determined and is represented by an x-coordinate $x_1$ and a y-coordinate $(-x_1 + 1)$ and that the input signal Si has x- and y-coordinates normalized into x and y, respectively. In the first phase, the nonlinear converter 12 compares the x-coordinate x of the input signal Si with the x-coordinate $x_1$ of the optimum cross point to check whether or not x is greater than $x_1$. If x is smaller than $x_1$, the nonlinear converter 12 produces, as the distortion compensated signal y, an output signal determined by one of the straight lines that passes through both points $(0, 0)$ and $(x_1, -x_1 + 1)$ and that is represented by:

$$y = [(1/x_1) - 1]x.$$

On the other hand, if x is equal to or greater than $x_1$, the nonlinear converter 12 produces, as the distortion compensated signal y, an output signal determined by another one of the straight lines that passes through two points $(x_1, -x_1 + 1)$ and $(1, 1)$ and that is represented by:

$$y = [x_1 - x/(1 - x_1)] + [(1 - 2x_1)/(1 - x_1)].$$

In any event, the nonlinear converter 12 produces the distortion compensated signal in the first phase in accordance with the above-mentioned two straight lines.

Subsequently, the nonlinear converter 12 is operated in the second phase to determine a quadratic curve which is represented by y=ax²+bx+c and which is the closest to the above-mentioned straight lines determined by the first phase. The quadratic curve (y=ax²+bx+c) passes through (0, 0) and (1, 1). In other words, the second phase is for determining the factors a, b, and c. For brevity of description, it is assumed that c=0 and b=1−a.

To this end, the nonlinear converter 12 calculates an area difference D between the quadratic curve and the above-mentioned two lines in accordance with the following equation, $$D = \int_0^{x_1} \{ax^2 + bx + c - (1/x_1 - 1)x\}^2 dx + \int_{x_1}^1 [ax^2 + bx + c - \{x_1x/(1-x_1) + (1-2x_1)/(1-x_1)\}]^2 dx \quad (7)$$

Thereafter, the nonlinear converter 12 decides the factors a, b, and c of the quadratic curve such that the area difference D becomes minimum. Such decision is made in the nonlinear converter 12 by the use of the table ROM 57 and the central processing unit 56, as illustrated in FIG. 5.

Figure 6B:
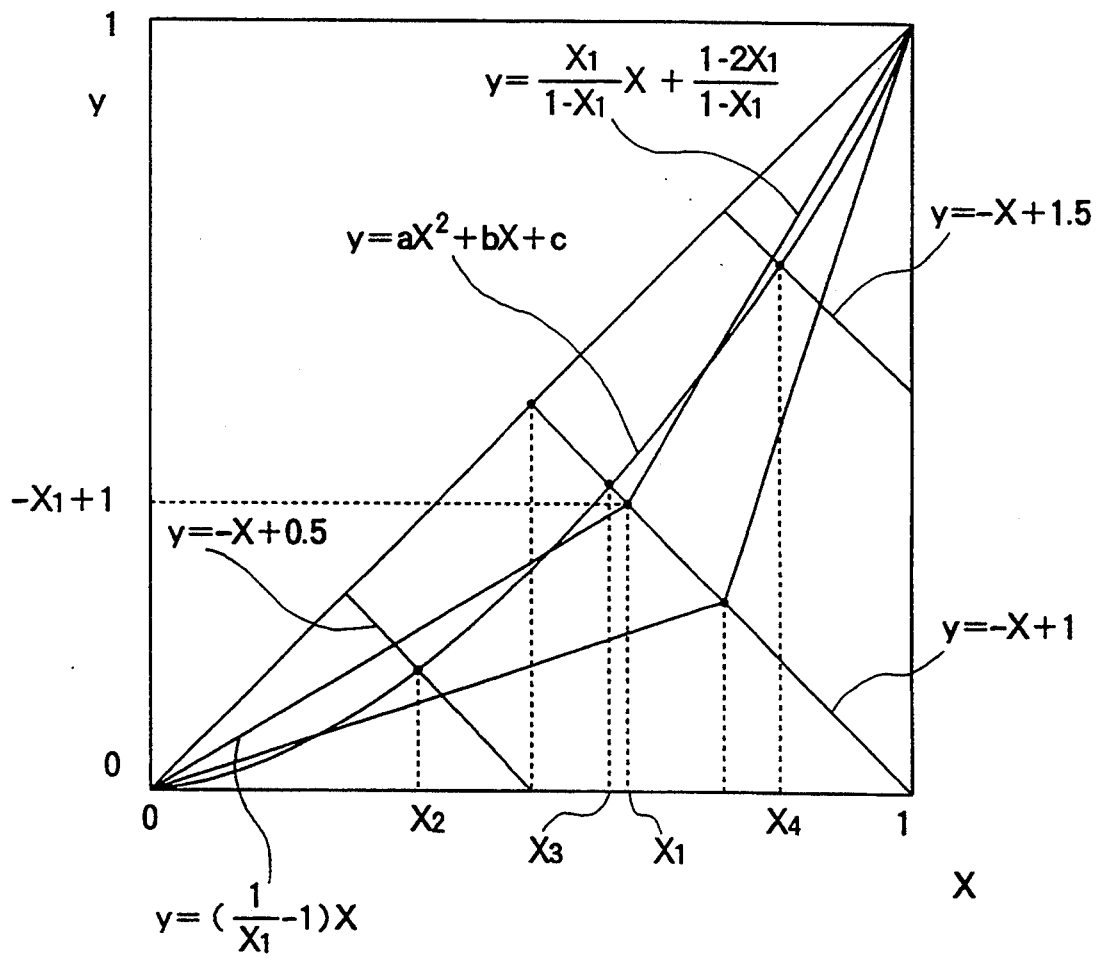

When the factors of the quadratic curve are decided in the above-mentioned manner, the nonlinear converter 12 approximates the quadratic curve by the use of the four of the straight lines in the second and the third phases. For this purpose, first, second, and third additional straight lines are drawn which are give in FIG. 6(B) by y=−x+0.5, y=−x+1, and y=−x+1.5, respectively. Subsequently, first through third cross points $x_2$, $x_3$, and $x_4$ between the quadrature curve and each of the first through the third additional straight lines are decided in the nonlinear converter 12 by the use of the table ROM 57 (FIG. 5). Thus, the second phase is completed in the nonlinear converter 12.

In the third phase, the first through the third cross points $x_2$ to $x_4$ are used as initial values to determine the four approximation straight lines defined between 0 and $x_2$, between $x_2$ and $x_3$, between $x_3$ and $x_4$, and between $x_4$ and 1. Thereafter, the four straight lines are optimized in a manner similar to that mentioned in connection with the first phase. If each of three cross points is selected from the candidate cross points of, for example, 256, the optimization can be achieved by repeating trials twenty-four times (=8×3). The repetition of the trials can be executed under control of the central processing unit 56 (FIG. 5).

From the above, it is readily understood that the illustrated nonlinear converter 12 produces the distortion compensated signal which depends on not only the nonlinear distortion but also the linear distortion. At any rate, the nonlinear amplifier 10 produces the modulated signal MS free from the nonlinear and the linear distortions.

Figure 7:
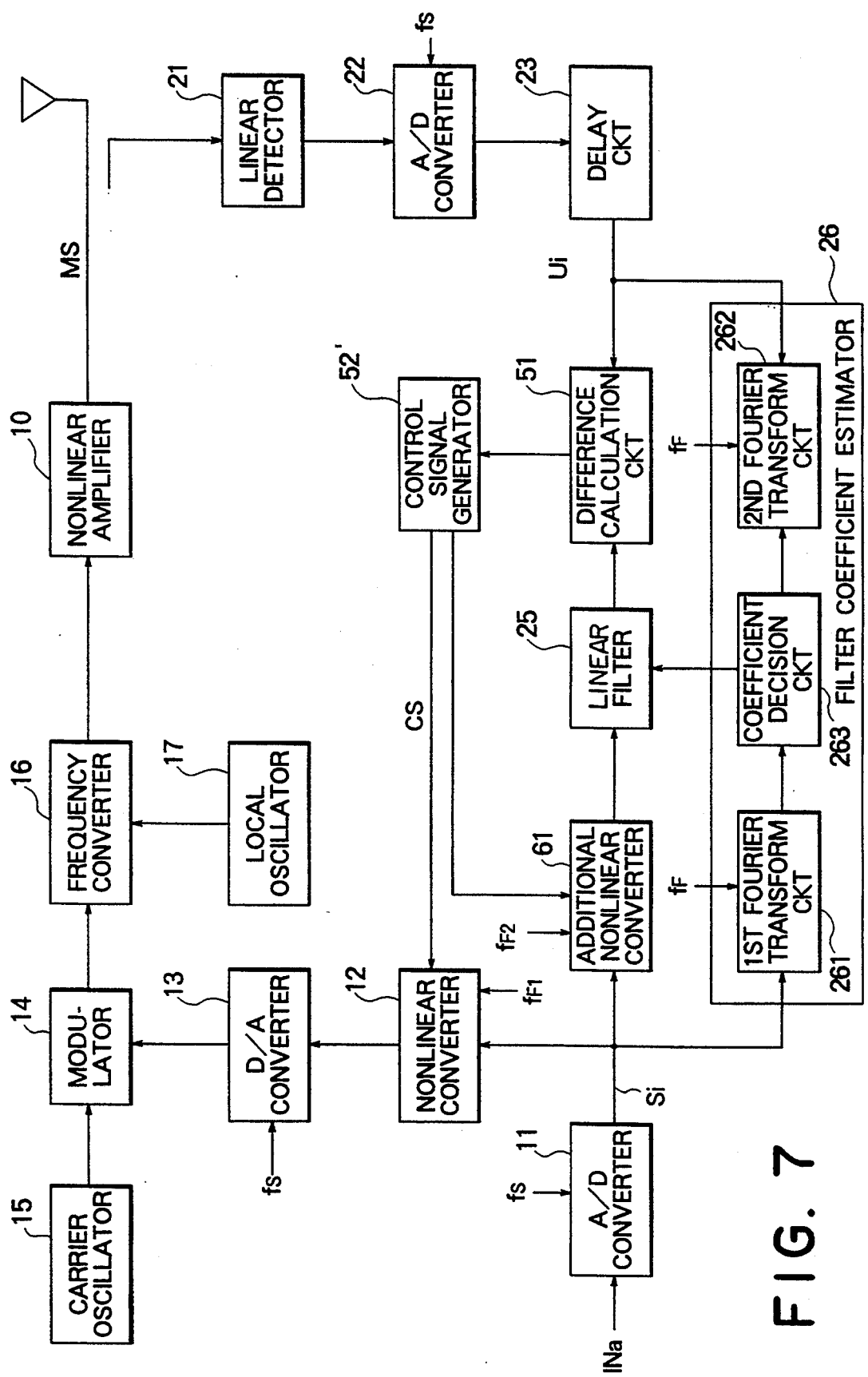
FIG. 7 is a block diagram of a modulated signal transmission system according to a second embodiment of this invention.

Referring to FIG. 7, a modulated signal transmission system according to a second embodiment of this invention is similar in structure and operation to that illustrated in FIG. 1 except that an additional nonlinear converter 61 is positioned between the A/D converter 11 and the linear filter 25 and is controlled by a control signal generator 52'.

With this structure, the additional nonlinear converter 61 has a controllable nonlinear characteristic and is controlled by the control signal generator 52' so that difference electric power supplied from the difference calculation circuit 51 becomes small. In the illustrated example, the control signal generator 52' controls the additional nonlinear converter 61 in a manner similar to the nonlinear converter 12 mentioned in conjunction with FIG. 1. Therefore, no description is made about the control operation of the additional nonlinear converter 61 any longer. At any rate, it may be understood that the input signal Si is preliminarily processed by the nonlinear converter 61 into a processed signal which is sent to the linear filter 25 and which is determined by the nonlinear conversion characteristic. As a result, the processed signal includes a nonlinear component determined by the nonlinear conversion characteristic of the additional nonlinear converter 61. Thus, the additional nonlinear converter 61 may be referred to as a preliminary processing unit. When the system illustrated in FIG. 7 is compared with that of FIG. 1, it is found out that the input signal Si in FIG. 1 is directly given to the linear filter 25 and is not kept unchanged. In this connection, it may be considered that the conductor line between the A/D converter 11 and the linear filter 25 serves to carry out preliminary processing of the input signal Si in FIG. 1.

Next, the control signal generator 52' controls the nonlinear converter 12 by the control signal CS to compensate for the nonlinear component of the additional nonlinear converter 61 and to therefore change the nonlinear conversion characteristic of the nonlinear converter 12 by supplying the nonlinear converter 12 with a component complementary to the nonlinear component of the additional nonlinear converter 61.

As a result, the linearly detected signal Ui is reduced in a nonlinear component while the difference signal from the difference calculation circuit 51 is increased.

Subsequently, the nonlinear converter 12 and the additional nonlinear converter 61 are repeatedly controlled in the above-mentioned manner. Consequently, the nonlinear conversion characteristic of the nonlinear converter 12 is converged so as to compensate the nonlinear amplification characteristic of the nonlinear amplifier 10 while the nonlinear conversion characteristic of the additional nonlinear converter 61 approaches a linear characteristic.

Let comparison be made between the modulated signal transmission systems illustrated in FIGS. 1 and 7. In FIG. 1, it is pointed out that the nonlinear conversion characteristic of the nonlinear converter 12 influences the modulated signal MS directly. Therefore, it is necessary to sufficiently lower a repetition frequency $f_{F1}$ which is used on a trial to optimize the nonlinear conversion characteristic of the nonlinear converter 12.

On the other hand, inasmuch as the additional nonlinear converter 61 does not influence the modulated signal MS directly, a repetition frequency $f_{F2}$ which is used on each trial in the additional nonlinear converter 61 may be increased within a range lower than the frame frequency $f_F$ used in the first and the second Fourier transform circuits 261 and 262. If a relationship of $f_F > f_{F1} > f_{F2}$ holds, the modulated signal transmission system illustrated in FIG. 7 can be quickly converged as compared with that illustrated in FIG. 1.

Figure 8:
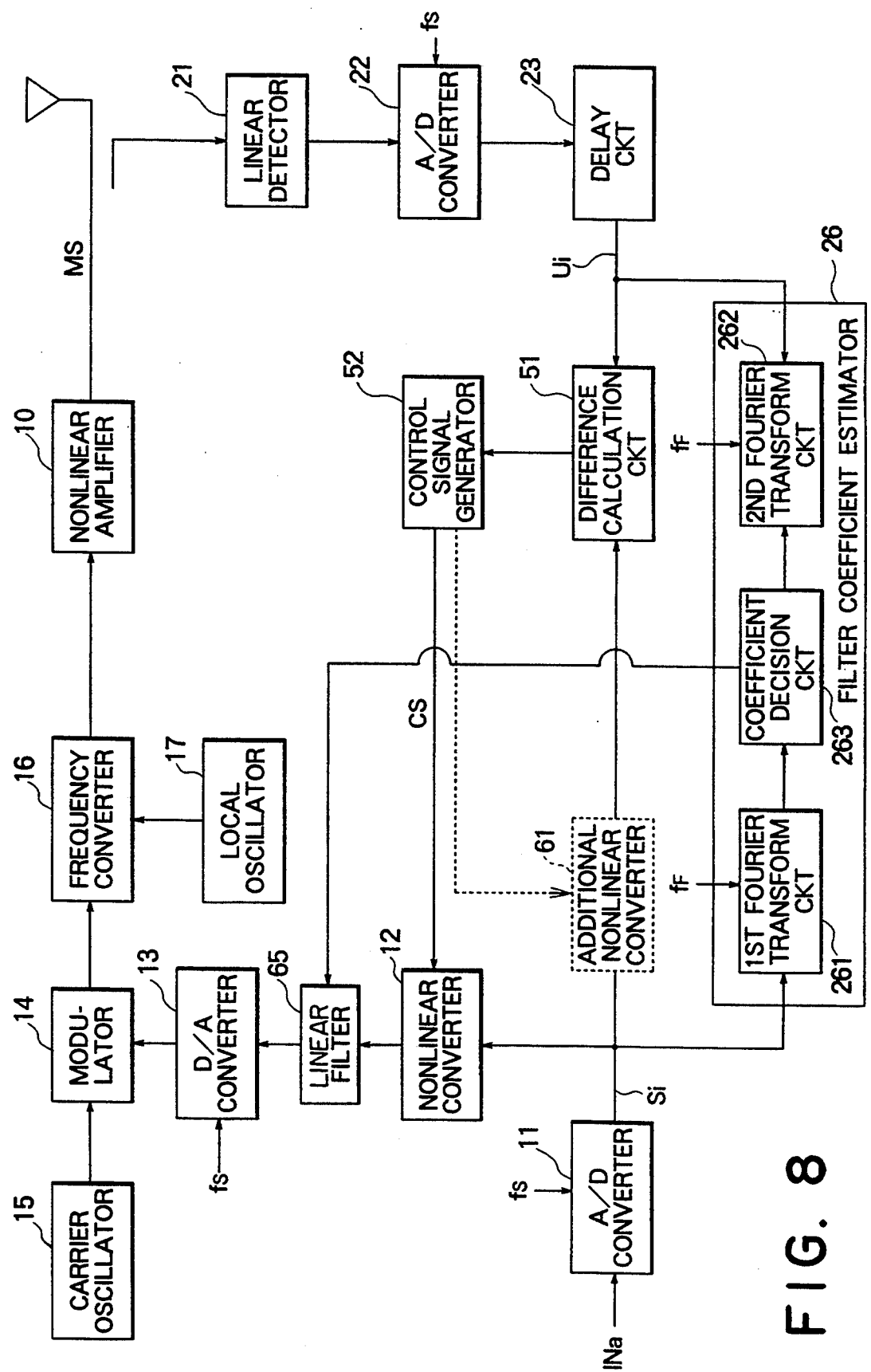
FIG. 8 is a block diagram of a modulated signal transmission system according to a third embodiment of this invention.

Referring to FIG. 8, a modulated signal transmission system according to a third embodiment of this invention is similar in structure to that illustrated in FIG. 1 except that the linear filter 25 illustrated in FIG. 1 is removed from the transmission system illustrated in FIG. 1 and, instead, a linear filter depicted at 65 is located between the nonlinear converter 12 and the D/A converter 13.

In FIG. 8, the filter coefficient estimator 26 estimates filter coefficients in a manner illustrated in FIG. 1 with a transfer function of the linear filter 65 kept at unity and supplies estimated filter coefficients to the linear filter 65. More specifically, the linear filter 65 has a transfer function complementary to the transfer function of the linear filter 25 and is operable in response to the filter coefficients supplied from the filter coefficient estimator 26.

With this structure, it is possible to compensate for a linear distortion which might occur in the nonlinear amplifier 10 and the like. As a result, the linearly detected signal Ui is free from the linear distortion in addition to the nonlinear distortion.

The illustrated difference calculation circuit 51 calculates a difference of electric power between the input signal Si and the linearly detected signal Ui to produce a difference power signal representative of the difference of the electric power. The difference of the electric power includes only electric power of the nonlinear distortion remaining in the linearly detected signal Ui.

Any other operations of the system illustrated in FIG. 8 are similar to the illustrated in FIG. 1 and will not therefore be described hereinunder.

While this invention has thus far been described in conjunction with a few embodiments thereof, it will readily be possible for those skilled in the art to put this invention into practice in various other manners. For example, the additional nonlinear converter 61 may be located between the difference calculation circuit 51 and the A/D converter 11 in FIG. 8, as shown by a broken line block and may be called a preliminary processing unit.

What is claimed is:

1. A modulated signal transmission system for use in modulating an input signal of a baseband to produce, through a nonlinear amplifier, a modulated signal which is substantially free from both a nonlinear distortion end a linear distortion, said nonlinear amplifier having a nonlinear amplification characteristic, said modulated signal transmission system comprising:

linear detection means partially supplied with said modulated signal for linearly detecting said modulated signal to produce a linearly detected signal;

estimating means supplied with said input signal and said linearly detected signal for estimating said linear distortion to produce an estimated signal including said estimated linear distortion;

difference calculation means supplied with said estimated signal and said linearly detected signal for calculating a difference of electric power between said estimated signal and said linearly detected signal to produce a control signal representative of said difference; and nonlinear converting means, which has a controllable nonlinear conversion characteristic for compensation of said nonlinear amplification characteristic of the nonlinear amplifier and which is supplied with said input signal and said control signal, for carrying out nonlinear conversion of said input signal in response to said control signal so as to reduce said difference and to thereby remove both said nonlinear and said linear distortions.

2. A modulated signal transmission system as claimed in claim 1, wherein said estimating means comprises:

preliminary processing means for preliminarily processing said input signal into a processed signal;

linear filtering means which is supplied with said processed signal and which has a plurality of controllable filter coefficients to define a filter characteristic determined by said controllable filter coefficients, for filtering said processed signal into a filtered signal to supply said filtered signal to said difference calculation means; and coefficient determining means supplied with said input signal and said linearly detected signal and connected to said linear filtering means for estimating said linear distortion to calculate the filter coefficients concerned with said linear distortion to supply the filter coefficients to said linear filter means.

3. A modulated signal transmission system as claimed in claim 2, wherein said preliminary processing means supplies said input signal as said processed signal to said linear filtering means, with said input signal kept unchanged.

4. A modulated signal transmission system as claimed in claim 2, wherein said preliminary processing means comprises:

additional nonlinear converting means located prior to said linear filtering means for carrying out nonlinear conversion of said input signal to supply an additional nonlinearly converted signal as said processed signal to said linear filtering means.

5. A modulated signal transmission system for use in modulating an input signal of a baseband to produce, through a nonlinear amplifier, a modulated signal which is substantially free from a nonlinear distortion and a linear distortion, said nonlinear amplifier having a nonlinear amplification characteristic, said modulated signal transmission system comprisings:

linear detection means partially supplied with said modulated signal for linearly detecting said modulated signal to produce a linearly detected signal;

nonlinear converting means, which has a controllable nonlinear conversion characteristic for compensation of said nonlinear amplification characteristic of the nonlinear amplifier and which is supplied with said input signal and a control signal, for carrying out nonlinear conversion of said input signal in response to said control signal so as to remove said nonlinear distortion and to produce a converted signal;

preliminary processing means for preliminarily processing said input signal into a processed signal;

difference calculation means supplied with said processed signal and said linearly detected signal for calculating a difference of electric power between said processed signal and said linearly detected signal to produce a control signal representative of said differences;

supply means for supplying said control signal to said nonlinear converting means to control the controllable nonlinear conversion characteristic of said nonlinear converting means;

linear filtering means, which is coupled to said nonlinear converting means and which has a plurality of controllable filter coefficients to define a filter characteristic determined by said controllable filter coefficients, for filtering said converted signal into a filtered signal;

coefficient determining means supplied with said input signal and said linearly detected signal and connected to said linear filtering means for estimating said linear distortion to calculate the filter coefficients concerned with said linear distortion to supply the filter coefficients to said linear filter means; and means connected to said linear filtering means for supplying said filtered signal to said nonlinear amplifier.

6. A modulated signal transmission system as claimed in claim 5, wherein said preliminary processing means supplies said input signal to said difference calculation means as said processed signal, with said input signal kept unchanged.

7. A modulated signal transmission system as claimed in claim 5, wherein said preliminary processing means comprised:

additional nonlinear converting means located prior to said difference calculation means for carrying out nonlinear conversion of said input signal to supply an additional nonlinearly converted signal as said processed signal to said difference calculation means.

* * * * *

UNITED STATES PATENT AND TRADEMARK OFFICE
CERTIFICATE OF CORRECTION

PATENT NO. : 5,339,054

DATED : November 9, 1994

INVENTOR(S) : Akira Tsujimoto

It is certified that error appears in the above-identified patent and that said Letters Patent is hereby corrected shown below:

Column 1, line 28, delete "wall" insert --will--.
Column 7 and 8, equation (4x), the equation overlaps equation (6) in Column 8. Equation (4x) should read $$a_1 R_{p-1}^{(i-p+1)} + a_2 R_{p-2}^{(i-p+1)} + a_3 R_{p-3}^{(i-p+1)} + \ldots + a_p R_0^{(i-p+1)} = \Phi_{p-1}^{(i-p+1)} \quad (4x)$$

Column 7, line 45, delete "welch", insert --which--
Column 8, lines 29-46, equation (6) is overlapped by equation (4x), and is separated in to two sections. Equation (6) should read Equation (5) is rewritten into:

$$\begin{bmatrix} a1 \\ a2 \\ a3 \\ \vdots \\ a_p \end{bmatrix} = \begin{bmatrix} R_0 & R_1 & R_2 & \cdots & R_{p-1} \\ R_1 & R_0 & R_1 & \cdots & R_{p-2} \\ R_2 & R_1 & R_0 & \cdots & R_{p-3} \\ \vdots & \vdots & \vdots & & \vdots \\ R_{p-1} & R_{p-2} & R_{p-3} & \cdots & R_0 \end{bmatrix}^{-1} \cdot \begin{bmatrix} \Phi_0 \\ \Phi_1 \\ \Phi_2 \\ \vdots \\ \Phi_{p-1} \end{bmatrix} \quad (6)$$

UNITED STATES PATENT AND TRADEMARK OFFICE
CERTIFICATE OF CORRECTION

PATENT NO. : 5,339,054
DATED : November 9, 1994
INVENTOR(S) : Akira Tsujimoto

It is certified that error appears in the above-indentified patent and that said Letters Patent is hereby corrected as shown below:

Column 10, line 2, delete "central" insert --control--
Column 11, line 59, delete "1" and insert --7--

Signed and Sealed this

Third Day of October, 1995

Attest:

BRUCE LEHMAN

Attesting Officer           Commissioner of Patents and Trademarks